United States Patent [19]

Eisinger et al.

[11] 4,420,284
[45] Dec. 13, 1983

[54] DEVICE FOR THE FEEDING OF MATERIAL BARS FOR PROCESSING MACHINES

[75] Inventors: Hans Eisinger, Kopernikusstrasse 40, D-8900 Augsburg 21, Fed. Rep. of Germany; Quido Kraus, Hirblingen, Fed. Rep. of Germany

[73] Assignee: Hans Eisinger, Augsburg, Fed. Rep. of Germany

[21] Appl. No.: 41,381

[22] Filed: May 22, 1979

[30] Foreign Application Priority Data

May 24, 1978 [DE] Fed. Rep. of Germany ....... 2822569

[51] Int. Cl.³ .............................................. B22Q 5/22
[52] U.S. Cl. ........................................ 414/17; 414/16; 414/19
[58] Field of Search .................. 414/16, 17, 18, 14, 414/745, 431; 279/4, 1 Q; 29/37 A; 82/2.5, 2.7

[56] References Cited

U.S. PATENT DOCUMENTS 2,272,720  2/1942  Mariotte ................................ 414/17
3,643,969  2/1972  Finley et al. .......................... 279/4

OTHER PUBLICATIONS

Ditson, J. A., *Tool Holder Assembly*, IBM Tech. Disc. Bult. Vol. 10, No. 9 Feb., 1968.

Primary Examiner—Robert B. Reeves
Assistant Examiner—Douglas D. Watts
Attorney, Agent, or Firm—Edward E. Pascal

[57] ABSTRACT

A device for the feeding of material bars for processing machines, with which in a tube the rearward end of the bar is moved in the direction of the processing machine by a piston guided in the tube and loaded by a pressurizing medium. A loading bellows loaded by the pressurizing medium is located behind the piston and a tubular diaphragm, loaded by the pressurizing medium, is located in the tube, supported in a rotatable manner.

9 Claims, 3 Drawing Figures

DEVICE FOR THE FEEDING OF MATERIAL BARS FOR PROCESSING MACHINES

BACKGROUND

The invention relates to a device for the feeding of material bars for processing machines, with which in a tube the rearward end of the bar is moved in the direction of the processing machine by a piston guided in the tube and loaded by a pressurising medium.

Devices of the above-mentioned type are already known, with which a piston guided in the tube moves the bar to be machined in the direction of the processing machine. The tube here has the function of a cylinder, that is, the volume of the tube behind the piston is loaded by a pressurising medium, for instance compressed air or hydraulic oil. It is a disadvantage with these known devices that the piston must be satisfactorily guided over a considerable length in the tube, in order to keep leakage losses of the pressurising medium as small as possible. This is virtually impossible with considerable tube lengths. Also if the tube is damaged or distorted a satisfactory guidance of the piston within the tube is no longer ensured. Consequently in the case of long tubes use is primarily made of a weight feed, where the piston is fixed to a cable which is led over turning rollers and carries a weight on its end. This again necessitates the tube being slotted over its entire length.

Another disadvantage of the known devices resides in the fact that the tube diameter has to be matched to the diameter of the material bar to be machined. The rotating bar of material, guided by the piston in the direction towards the processing machine, sags, which leads to it being caused to vibrate, and these vibrations are transmitted to the entire bar feeding device and the processing machine. Through an appropriate choice of the tube diameter it is possible to hold the amplitude of the vibrations within limits. This however leads to wear phenomena which again affect the satisfactory gudance of the piston in the tube. Moreover an unpleasant noise results from the contact between bar and tube, which can only be reduced by expensive external damping measures.

The problem exists so as to constitute the bar feeding device that a satisfactory guidance of the piston in the tube is possible without losses of the pressurised medium through leakage and the vabrations of the bar referred to above are avoided.

SUMMARY OF THE INVENTION

This problem is solved through two features, namely in that a sealing bellows loaded by the pressurising medium is located behind the piston, and further in that a tubular diaphragm loaded by the pressurising medium is supported rotatably in the tube.

Preferably the piston is hollow, and the collapsed and thus unpressurised bellows is located within it. This has the result that the piston is guided over a considerable structural length. The feeding force which acts upon the bar can be adjusted through a pressure valve, so that a harsh travel of the material bar, such as occurs with weight and pneumatic feeds as the bar of material becomes shorter, is prevented.

A further advantage of the internally loaded bellows consists in the complete enclosure of the pneumatic or hydraulic system, so that no special precautions have to be taken to lead away overflowing oil. Moreover when oil is employed as the pressurising medium, a damping of any vibration that might occur is attained. After the bar has been processed, the piston can be brought back to its initial position by sucking the pressurising medium of the loading bellows.

It is a great advantage that the holding power of the piston can be specifically adjusted. Through this it is possible to keep the loading of the clamping device of the processing machine low, since the holding power of the piston acts against the force arising from the cutting action.

Through the use of a tubular diaphragm loaded by the pressurising medium, a centering of the bar in the tube is attained. In this way a sagging of the bar and thus the occurrence of vibration will thus be avoided. It is thus also possible to select a tube diameter which corresponds to the passage of the working spindle of the processing machine. Through this a matching of the tube cross-section to the bar diameter is eliminated. It is of particular imortance that without further provision it is also possible for bars to be fed, of which the diameter deviates from the circular form. Here the diaphragm bears upon the contour of the bar and satisfactorily centres this. If the tubular diaphragm is loaded with pressurised oil, then an additional damping effect is obtained. Through the use of one or more tubular diaphragms it is possible to construct longer devices, that is, longer bars can be processed than is customary.

BRIEF INTRODUCTION TO THE DRAWINGS

One embodiment example of the invention will now be described in more detail on the basis of the drawings. They show:

DETAILED DESCRIPTION OF THE INVENTION

Figure 1:
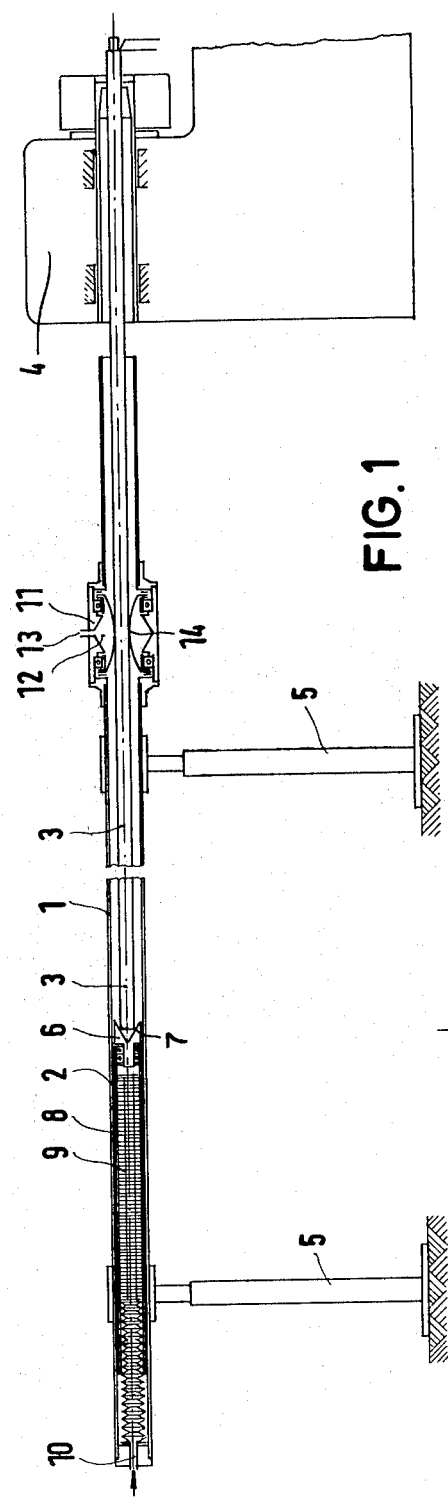
FIG. 1 is a section through the device.

The device exhibits a tube 1, within which a piston 2 is guided. This piston 2 moves a material bar 3 in the direction towards the processing machine 4. The tube 1 is supported at intervals by pillars 5.

The piston 2 guided in the tube 1 has a frontal part 6 which is supported rotatably through ball bearings and is provided on the front face with a conical central bore 7. This makes it possible for the frontal part 6 of the piston 2 to adopt the rotary movement of the bar 3 and simultaneously centres the rear end of the bar.

The piston 2 consists substantially of a tubular part 8. Within this tubular part 8 is a loading bellows 9, which preferably is or rubber of a suitable elastic plastics material. The front end of this loading bellows 9 is connected to the piston 2. At the rear end the loading bellows 9 is connected through a wall part with the tube 1. A pipe connection 10 is led through this wall part, to introduce the pressurising medium into the interior of the loading bellows. The length of the tubular piston part 8 here approximately corresponds to the collapsed length of the loading bellows 9.

A casing 11 is connected to the tube 11. Within this casing 11 an annular chamber 12 is provided which can be loaded with a pressurising medium through a drilling 13. Inside the casing there is a tubular diaphragm 14 which is held by a retainer 15 at each of its two ends. The retainers 15 are carried free to rotate in the casing on ball bearings 16.

If oil is forced into the chamber 12 through the aperture 13, then the tubular diaphragm 14 bears against the material bar 3. In this way any sagging of the material bar 3 is avoided and this material bar is centred at a distance from the piston 2.

In order to facilitate an unimpeded guidance of the piston 2 even in the zone of the tubular diaphragm 14, the inside diameter of the tubular diaphragm 14 not loaded by the pressurising medium is slightly greater than the inside diameter of the tube 1.

Figure 3:
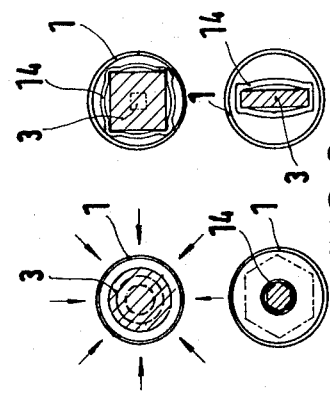
FIG. 3 is a section in the zone of the tubular diaphragm to clarify the bearing contact of the tubular diaphragm on different material bar cross-sections.
Figure 2:
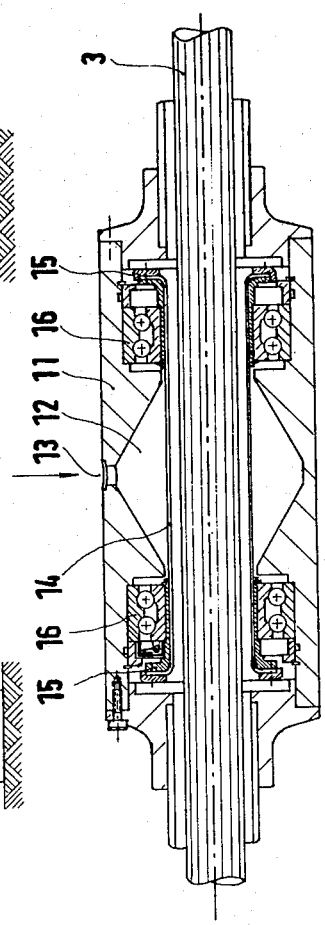
FIG. 2 is a longitudinal section in the zone of the tubular diaphragm.

FIG. 3 shows how the tubular diaphragm 14 attains large and small sections and varying cross-sectional shapes on bars 3.

We claim:

1. A device for feeding bars of material to processing machines, comprising a tube in which a bar of material can be axially advanced in the direction of the processing machine, a piston guided in the tube over a substantial length thereof for applying axial pressure against the bar of material, a bellows, adapted to be loaded by a pressurizing medium, located behind the piston for applying pressure to the piston, the piston being hollow and the loading bellows being located within it when collapsed, pressure valve means for controlling the pressure of the pressurizing medium applied to the bellows for controlling the feeding force of the piston acting on the bar material, a tubular diaphragm, loaded by the pressurizing medium, located in the tube and supported in a rotatable manner, whereby the bar of material can be centered, the inside diameter of the diaphragm which is not loaded by the pressurizing medium being equal to or greater than the inside diameter of the tube.

2. A device as defined in claim 1 in which the rear face of the piston is connected to the front face of the loading bellows.

3. A device as defined in claim 1 in which the front part of the piston is supported rotatably and is provided with a conical centering bore in its front face.

4. A device as defined in claim 1 in which the rear end of the loading bellows is joined to a pipe connection which passes out of the rear end of the tube.

5. A device as defined in claim 1 in which the rear face of the front of the piston is connected to the front face of the loading bellows.

6. A device as defined in claim 5 in which the front part of the piston is rotatably supported and is provided with a conical centering bore in its front face.

7. A device as defined in claim 6 in which the rear end of the loading bellows is joined to a pipe connection which passes out of the rear end of the tube.

8. A device as defined in claim 1 or 7 in which the tubular diaphragm is held at both ends by retainers, the retainers being supported rotatably in a casing joined to the tube.

9. A device as defined in claim 8, in which the casing contains an annular chamber in the zone of the tubular diaphragm.

* * * * *